Nov. 10, 1942.                H. T. LAMB                2,301,887
                PORTABLE MECHANICALLY OPERATED DRILL
                    Filed Aug. 5, 1940           2 Sheets-Sheet 1
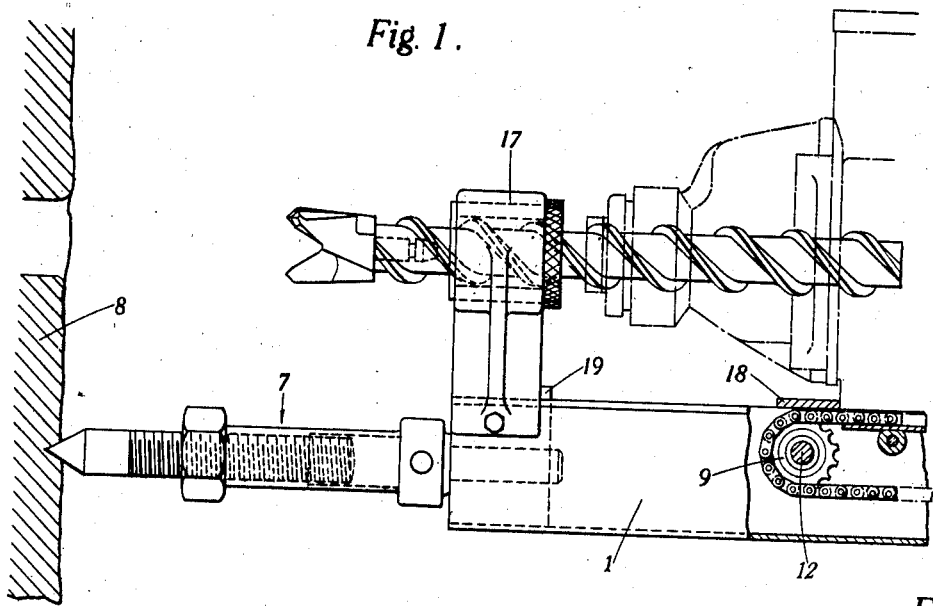
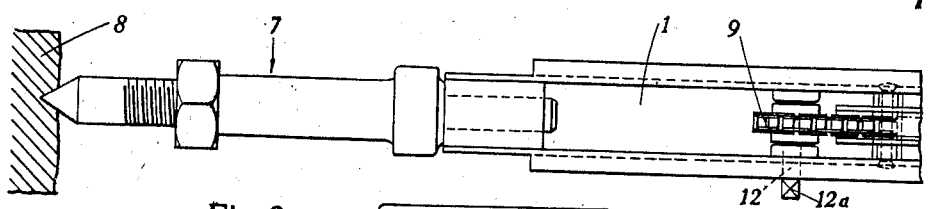
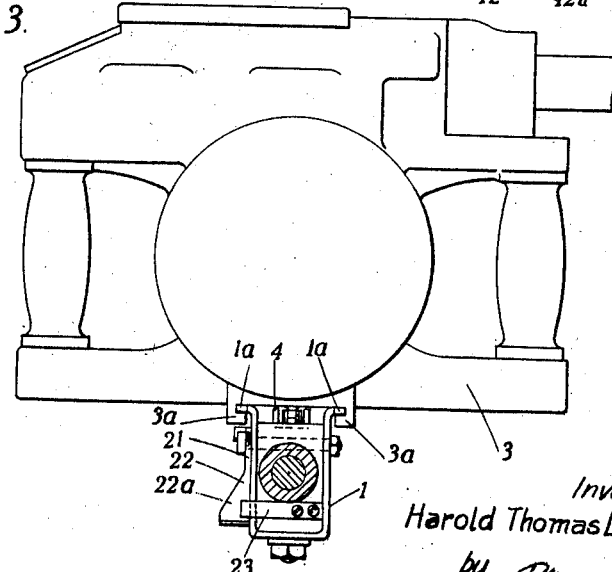
Inventor.
Harold Thomas Lamb.
by R. Haddan
Attorney.

Nov. 10, 1942.     H. T. LAMB     2,301,887
PORTABLE MECHANICALLY OPERATED DRILL
Filed Aug. 5, 1940     2 Sheets-Sheet 2
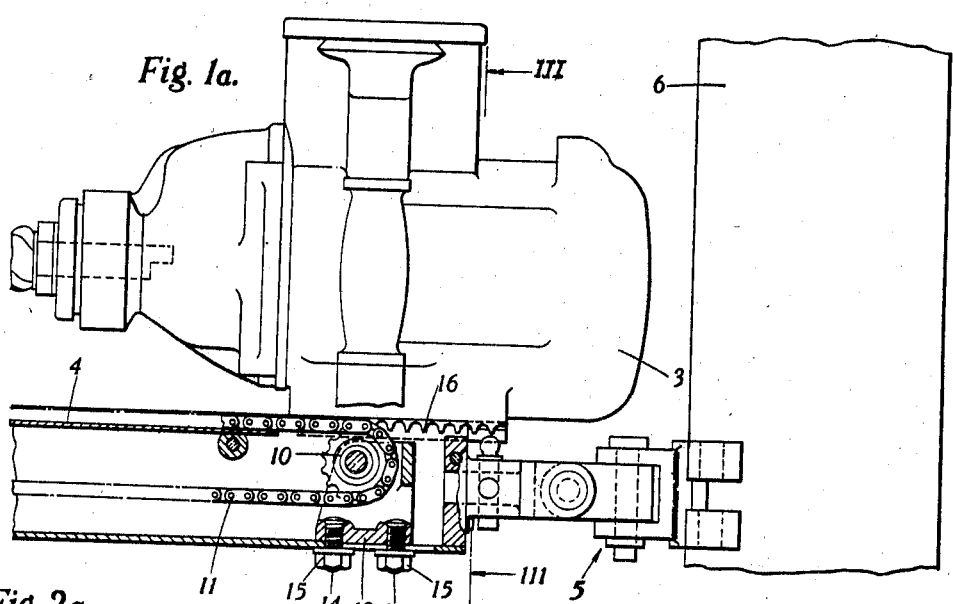
Fig. 1a.
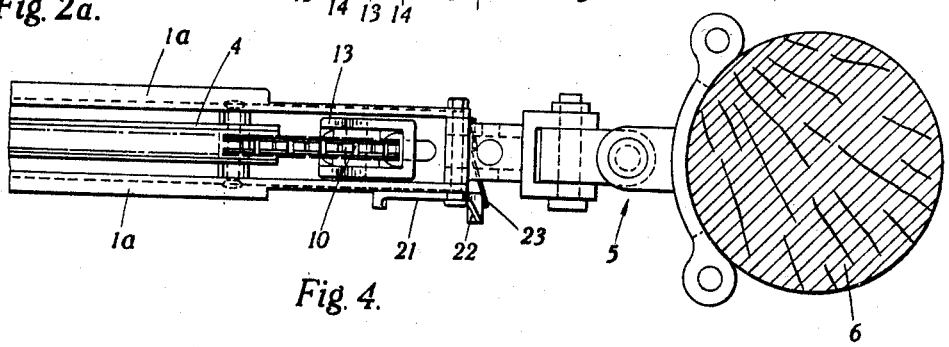
Fig. 2a.
Fig. 4.
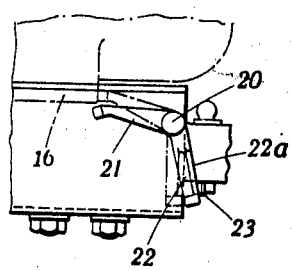
Inventor:
Harold Thomas Lamb.
by
Attorney.

Patented Nov. 10, 1942

2,301,887

UNITED STATES PATENT OFFICE 2,301,887

PORTABLE MECHANICALLY OPERATED DRILL

Harold Thomas Lamb, Newcastle-on-Tyne, England

Application August 5, 1940, Serial No. 351,477
In Great Britain August 8, 1939

5 Claims. (Cl. 255—45)

This invention relates to portable mechanically operated drills for use in coal mines and the like.

The object of the invention is to provide an improved form of feed mechanism which will not be liable to become clogged with foreign matter as is the case with that type of feed which comprises a feed screw and nut. Another object is to provide a support for the drilling machine which will enable the whole mechanism to maintain its alignment and resist warping due to the pressure required to be exerted between on the one hand the supporting means and on the other hand the face being operated on and the abutment against which the drill machine casing presses. A further object of the invention is to provide a form of feed which will enable the machine to be quickly disassembled from its support when desired, and also to change the position of the machine relatively to the feed mechanism when wear occurs. A still further object is to provide a form of support which in conjunction with the feed will give a relatively simple and inexpensive form of construction which will give greater rigidity and dispense with the necessity of special carriages on which to mount the machine.

The feed mechanism according to the invention comprises a longitudinal support on which the drilling machine casing is adapted to be slidably mounted for longitudinal movement, while a feed chain sprocket is mounted at one end of the support and a tail chain sprocket at the other end, and an endless chain passed over the said sprockets, the said chain being adapted to engage with a series of projections which may be in the form of a rack on the drilling machine casing, while means are provided for turning the feed chain sprocket to effect the feed.

The means for turning the feed sprocket may comprise a ratchet mechanism of well known type.

The tail sprocket is mounted so as to be slidable longitudinally on the support, to take up slack on the chain.

The invention will now be described with reference to the accompanying drawings which show an example of construction as applied to an electric stone or coal drill.

In the said drawings:

Figs. 1 and 1a are together a longitudinal elevation in part section.

Figs. 2 and 2a are together a plan view of Fig. 1.

Fig. 3 is a section on the line III—III of Fig. 1, but with the motor and associated elements in outside elevation.

Fig. 4 is an outside elevation of the right hand portion of Fig. 3.

Referring more particularly to the drawings, the drill support comprises a girder 1 of relatively deep channel section having horizontal flanges 1a at the upper edge of the flanges of the channel section to form guides for corresponding shoes 3a on the drilling machine casing 3. The upper end of the channel section 1 is closed with a chain guide plate 4 (Fig. 3) of relatively shallow channel section, the said chain plate being so positioned that a sprocket chain lying on it has its upper portion about flush with the longitudinal guide flanges, so as to be in a position to engage the rack (hereinafter referred to) on the drilling machine casing 3.

At the outer end of the said girder there are the usual means—indicated generally at 5—for holding the support against a pit prop 6 or the like, while at the inner end there is arranged a telescopic screw-threaded steady 7 for abutting against the stone or coal face 8.

The chain plate 4 is cut short at either end to accommodate chain sprockets 9, 10 respectively, while a chain 11 is passed over the sprockets so that its upper portion rests on the chain plate 4 and its return portion passes underneath the plate.

The sprocket 9 at the inner end is mounted on a transverse feed shaft 12, which has on its outer end a square 12a to take a ratchet lever (not shown) for turning the sprocket.

At the outer end of the support 1 there is slidably mounted a block 13 carrying the tail sprocket 10, studs 14 passing through a longitudinal slot in the web of the girder 1; and nuts 15 serving to lock the block 13 in position.

The upper portion of the chain 11 also engages with abutments which take the form of a short rack 16 (although the said rack does not function in the usual manner associated with a rack) arranged on the underside of the drilling machine casing 3 so that movement of the chain slides the drill casing along the support.

At the inner end of the support there is mounted a drill rod guide 17 which serves to maintain the drill rod in its correct axial alignment. A stop 18 limits the inward feed of the casing 3 and a stop 19 locates the guide 17.

At the outer end of the girder 1 there is pivotally mounted about a pin 20 a pawl-like stop 21, 22, the one arm 21 of which is adapted to engage behind the rack 16 when the casing 3 has been slid into position on the girder 1, a flat spring 23 serving to maintain the said arm 21 in its uppermost position, while a projection 22a on the arm 22 facilitates the release of the arm 21.

The flanges 1a are cut away at the rear end to allow of the drilling machine being placed on the girder in such a manner as to facilitate its engagement with the said flanges, the arrangement being such that when the rack 16 is held by the arm 21 (Fig. 4) the casing is in engagement with the flanges 1a.

With this arrangement after the support has been arranged in position and the drilling machine set, feeding is effected by the operation of the ratchet on the square 12a which causes movement of the chain 11 so that the drill casing 3 is fed along the support 1. When the drilling machine has reached its inner limit the ratchet is removed from the square 12a and the machine retracted to the rear end of the machine, when a further drilling rod may be inserted.

With this mechanism the thrust on the support is in alignment with chassis so that there is no tendency for warping to take place as is the case in the usual screw-feed drills which have the supporting thrust in off-set directions that is to say through the drill on the one hand and through the rear abutment on the other hand, the said abutment being out of axial alignment with the drill. Hence warping of the drills is entirely obviated. Further, owing to the action of the chain and sprockets, any foreign matter that may get into the chain or onto the sprockets is always removed by the action of the chain over the sprockets, the sprocket teeth clearing the space between the chain rollers and the chain rollers squeezing out any dirt that may be deposited on the sprockets and on the rack underneath the drilling machine casing. Again, the rack 16 allows of the rapid assembly and disassembly of the machine, the machine requiring only to be placed over the chain to effect engagement; while the series of rack teeth reduce wear and when wear does occur the casing requires only to be moved to engage with a fresh portion of the chain.

What I claim as my invention and desire to secure by Letters Patent of the United States is:

1. Improved feed mechanism for use with portable mechanically operated drilling machines comprising a longitudinal stationary support on which the drilling machine casing is adapted to be slidably mounted for longitudinal movement, a feed chain sprocket mounted at one end of the support, a tail chain sprocket mounted at the other end of said support, an endless chain passed over said sprockets, tooth-like abutment means on said drilling machine casing, said abutment means being adapted to pass between adjacent links at any portion of said chain in a freely detachable manner, so that engagement and disengagement of the machine with the chain is effected merely by lowering the said machine onto or raising it from the chain.

2. Feed mechanism according to claim 1, wherein the support comprises a channel section girder having horizontal flanges at the upper edges of the flanges of the channel section to form guides for corresponding shoes on the drilling machine casing, a chain guide plate of relatively shallow channel section, the said chain plate being cut short at either end to accommodate one of the chain sprockets, while the chain is passed over the sprockets so that its upper portion rests on the chain plate and its return portion passes underneath the plate, and the said chain plate being so positioned that the chain lying on it has its upper portion about flush with the longitudinal guide flanges so as to be in a position to engage the abutment means on the drilling machine casing.

3. Feed mechanism according to claim 1 wherein the support comprises a channel section girder having horizontal flanges at the upper edges of the flanges of the channel section to form guides for corresponding shoes on the drilling machine casing, said horizontal flanges being cut away at the rear end to allow of the drilling machine being placed on the girder in such a manner as to facilitate its engagement with said flanges, a chain guide plate of relatively shallow channel section, the said chain plate being cut short at either end to accommodate one of the chain sprockets, while the chain is passed over the sprockets so that its upper portion rests on the chain plate and its return portion passes underneath the plate, and the said chain plate being so positioned that the chain lying on it has its upper portion about flush with the longitudinal guide flanges so as to be in a position to engage the abutment means on the drilling machine casing.

4. Feed mechanism according to claim 1, an abutment on the drilling machine casing, pivotally mounted on the support a pawl-like stop which is adapted to engage behind said abutment when said casing has been brought into the position on the support of full engagement with the chain, a release arm on said pawl-like stop, and a spring abutting against said arm to maintain the pawl-like stop in the engaging position, the arrangement being such that when the drilling machine casing is held by the pawl-like stop the casing is in engagement with the flanges.

5. Feed mechanism according to claim 1, wherein the abutment means comprise a series of teeth of a pitch corresponding with that of the endless chain.

HAROLD THOMAS LAMB.